United States Patent [19]
Miyagi

[11] Patent Number: 5,661,722
[45] Date of Patent: Aug. 26, 1997

[54] USAGE PARAMETER CONTROL AND PERFORMANCE MONITORING APPARATUS USED FOR CELL STREAM IN ATM NETWORK

[75] Inventor: Morihito Miyagi, Kodaira, Japan

[73] Assignee: Hitachi, Ltd., Tokyo, Japan

[21] Appl. No.: 531,396

[22] Filed: Sep. 21, 1995

[30] Foreign Application Priority Data

Sep. 29, 1994 [JP] Japan .................. 6-234783

[51] Int. Cl.[6] ...................................... H04T 3/14
[52] U.S. Cl. .................. 370/235; 370/252; 370/395
[58] Field of Search ................. 370/17, 60, 60.1, 370/94.1, 94.2, 229, 230, 231, 232, 233, 234, 235, 236, 238, 252, 395; 395/182.02, 184.01

[56] References Cited

U.S. PATENT DOCUMENTS

| | | | |
|---|---|---|---|
| 5,253,247 | 10/1993 | Hirose et al. ................. | 370/14 |
| 5,267,232 | 11/1993 | Katsube et al. ............... | 370/17 |
| 5,315,586 | 5/1994 | Charvillat .................... | 370/60 |
| 5,394,408 | 2/1995 | Nishihara et al. ............ | 370/94.1 |
| 5,402,412 | 3/1995 | Duffie et al. ................. | 370/17 |
| 5,432,713 | 7/1995 | Takeo et al. .................. | 364/514 |
| 5,465,348 | 11/1995 | Amemiya et al. ............. | 395/182.02 |
| 5,511,066 | 4/1996 | Witters et al. ................ | 370/17 |
| 5,519,689 | 5/1996 | Kim ............................. | 370/17 |

OTHER PUBLICATIONS

ITU-T (a department for standardizing the telecommunications of the International Telecommunication Union) Recommendation I.610 of Broadband ISDN.

A study of VP Transmission Quality Monitor System Using Variable-Length Block in ATM Network, by Ohta, et al., Shingaku Technical Journal CS92-31.

Primary Examiner—Hassan Kizou
Assistant Examiner—Kwang Bin Yao
Attorney, Agent, or Firm—Antonelli, Terry, Stout & Kraus, LLP.

[57] ABSTRACT

A usage parameter control and performance monitoring apparatus used for cell stream in an ATM network monitoring the performance of cell streams in includes a UPC unit for receiving an input cell stream and executing the UPC processing of the input cell stream; and receiving unit the for receiving the input cell stream and monitoring the performance of said input cell stream in accordance with a performance monitoring cell stream corresponding to the input cell stream received by said UPC unit, as a consequence, cell stream not subjected to the UPC processing are checked by corresponding performance monitoring cell stream, and performance calculations of cell loss, cell misinsertion, bit error, etc., are calculated for the cell stream subjected to the UPC processing.

10 Claims, 6 Drawing Sheets

USAGE PARAMETER CONTROL AND PERFORMANCE MONITORING APPARATUS USED FOR CELL STREAM IN ATM NETWORK

BACKGROUND OF THE INVENTION

The present invention relates to a UPC (Usage Parameter Control) circuit and a performance monitoring cell processing circuit arranged in a channel section of an ATM exchange.

The ITU-T (a department for standardizing the telecommunications of the International Telecommunication Union) Recommendation I.610 entitled "The Principles of Operation and Maintenance and Functions of Broadband ISDN" specifies an OAM cell for performance monitoring of the ATM connection and a method thereof. A method of performance monitoring is also studied and commented in "A Study of VP Transmission Quality Monitor System Using Variable-Length Block in ATM Network" by Ohta, et al., Shingaku Technical Journal CS92-31.

SUMMARY OF THE INVENTION

The object of the present invention is to provide a usage parameter control and performance monitoring apparatus used for cell stream in ATM network capable of accurately executing the performance monitoring of user cell stream.

According to one aspect of an embodiment of the invention, a usage parameter control and performance monitoring apparatus used for cell stream in an ATM network for UPC (Usage Parameter Control) processing and monitoring performance of the cell streams in asynchronous transfer mode, comprises a UPC circuit for receiving and effecting the UPC processing of an input cell stream and a performance monitoring cell processing circuit for monitoring the performance of an input cell stream on the basis of a performance monitoring cell stream corresponding to the input cell stream received by the UPC circuit.

The UPC circuit and the performance monitoring cell processing circuit are adapted to be included in a channel processing section for each channel on input side of the ATM exchange.

The UPC circuit includes a user cell UPC circuit for executing the UPC processing for a first user cell stream which is one of a plurality of user cell streams and passing the other user cell streams contained in an input cell stream, and a delay circuit for delaying the first user cell stream by the time required for the UPC processing by the user cell UPC circuit.

The performance monitoring cell processing circuit includes a performance monitoring cell checking circuit for receiving a first performance monitoring cell stream corresponding to the first user cell stream from the UPC circuit and also the first user cell stream not subjected to the UPC processing synchronous from the delay circuit and checking the first user cell stream not subjected to the UPC processing on the basis of the first performance monitoring cell stream, and a performance monitoring cell generation circuit for generating a second performance monitoring cell stream corresponding to the second user cell stream subjected to the UPC processing.

Also, the UPC circuit includes a cell decision circuit for discriminating the first user cell stream from the first performance monitoring cell stream thereby to output a decision signal deciding that the first user cell stream is intended for the UPC processing, a UPC decision circuit for outputting an instruction signal for commanding the execution of UPC processing in response to the decision signal, a UPC circuit for executing the UPC processing in accordance with an instruction signal from the UPC circuit in response to the first user cell stream and the corresponding first performance monitoring cell stream and producing a second user cell stream subjected to UPC processing in accordance with the instruction signal from the UPC decision circuit and a corresponding first performance monitoring cell stream, and a delay circuit for receiving the first user cell stream from the cell decision circuit and delaying the first user cell stream by the time required for the UPC processing by the UPC circuit.

The performance monitoring cell processing circuit further includes a cell decision circuit for receiving a second user cell stream subjected to UPC processing and a corresponding first performance monitoring cell stream, discriminating the second user cell stream from the corresponding first performance monitoring cell stream thereby and passing the user cell stream other than the first performance monitoring cell stream and the second user cell stream together with corresponding performance monitoring cell stream, a first intended user cell retrieve section for receiving the first user cell stream not subjected to UPC processing from the delay circuit, an intended performance monitoring cell retrieve circuit for receiving the first performance monitoring cell stream from the cell decision circuit, a performance monitoring cell checking circuit for checking the first user cell stream not subjected to UPC processing from the intended user cell retrieve section on the basis of the first performance monitoring cell stream from the intended monitoring cell retrieve section, a second intended user cell retrieve section for receiving the second user cell stream subjected to UPC processing from the cell decision circuit, a performance monitoring cell generation circuit for generating a new second performance monitoring cell stream corresponding to the second user cell stream on the basis of the result of checking by the performance monitoring cell checking circuit, and a performance monitoring cell extraction/insertion circuit for inserting the second performance monitoring cell stream generated by the performance monitoring cell generation circuit in the performance monitoring cell stream and the other user cell streams passed through the cell decision circuit.

The performance monitoring cell processing circuit includes a parameter table for storing parameters both already calculated and to be calculated for the performance monitoring cell stream. The performance monitoring cell checking circuit checks the first user cell stream not subjected to UPC processing by the use of a calculated parameter, and the performance monitoring cell generation circuit generates a second performance monitoring cell stream using a calculated parameter.

The performance monitoring cell checking circuit and the performance monitoring cell generation circuit, which are connected to a controller in an exchange, receive an instruction for checking the first user cell stream and generating the second performance monitoring cell stream, respectively.

In the above-mentioned configuration, a user cell stream not subjected to UPC processing is checked by a corresponding performance monitoring cell stream thereby to perform the performance calculations such as the cell loss, cell misinsertion or bit error. As a result, performance calculations of user cell stream can be correctly performed without subjecting to affection of the UPC processing.

According to a second aspect of an embodiment of the present invention, a usage parameter control and performance monitoring apparatus used for cell stream in an ATM network for UPC (Usage Parameter Control) processing and monitoring performance of the cell streams in asynchronous transfer mode, comprises a cell decision circuit for receiving an input cell stream, discriminating a first user cell stream which is one of a plurality of user cell streams included in the input cell stream from a corresponding first performance monitoring cell stream, producing the first user cell stream and the first performance monitoring cell stream, passing user cell streams and corresponding performance monitoring cell streams other than the first user cell stream and the first performance monitoring cell stream, and producing a first instruction signal indicating whether a given cell stream is the first user cell stream or the first performance monitoring cell stream and a second instruction signal indicating whether the first user cell stream is intended for UPC processing, a performance monitoring cell processing circuit for receiving the first performance monitoring cell stream and the first user cell stream from the cell decision circuit and the first instruction signal, a UPC decision circuit for receiving the second instruction signal from the cell decision circuit and producing a third instruction signal for UPC processing when the second instruction signal indicates the UPC processing, and a UPC processing/user cell extraction/insertion circuit for receiving the first user cell stream and the first performance monitoring cell stream from the cell decision circuit. The performance monitoring cell processing circuit checks the first user cell stream on the basis of the first performance monitoring cell stream in accordance with the first instruction signal and the third instruction signal, generates a second performance monitoring cell stream for the first user cell stream, and produces a corresponding fourth instruction signal. The UPC processing/user cell extraction/insertion circuit, on the other hand, inserts the second performance monitoring cell stream from the performance monitoring cell processing circuit in the user cell streams and the performance monitoring cell streams other than the first user cell stream and the first performance monitoring cell stream in accordance with the third and fourth instruction signals thereby to execute the checking of the first user cell stream not subjected to UPC processing and the UPC processing of the first user cell stream in parallel.

As a consequence, the checking of user cell stream not subjected to UPC processing and the UPC processing thereof can be performed in parallel. In addition, the user cell stream can be checked with corresponding performance monitoring cell stream, so that performance calculations of cell loss, cell misinsertion, bit error, etc., of user cell stream without subjecting to affection of the UPC processing.

DESCRIPTION OF THE PREFERRED EMBODIMENTS

Figure 1:
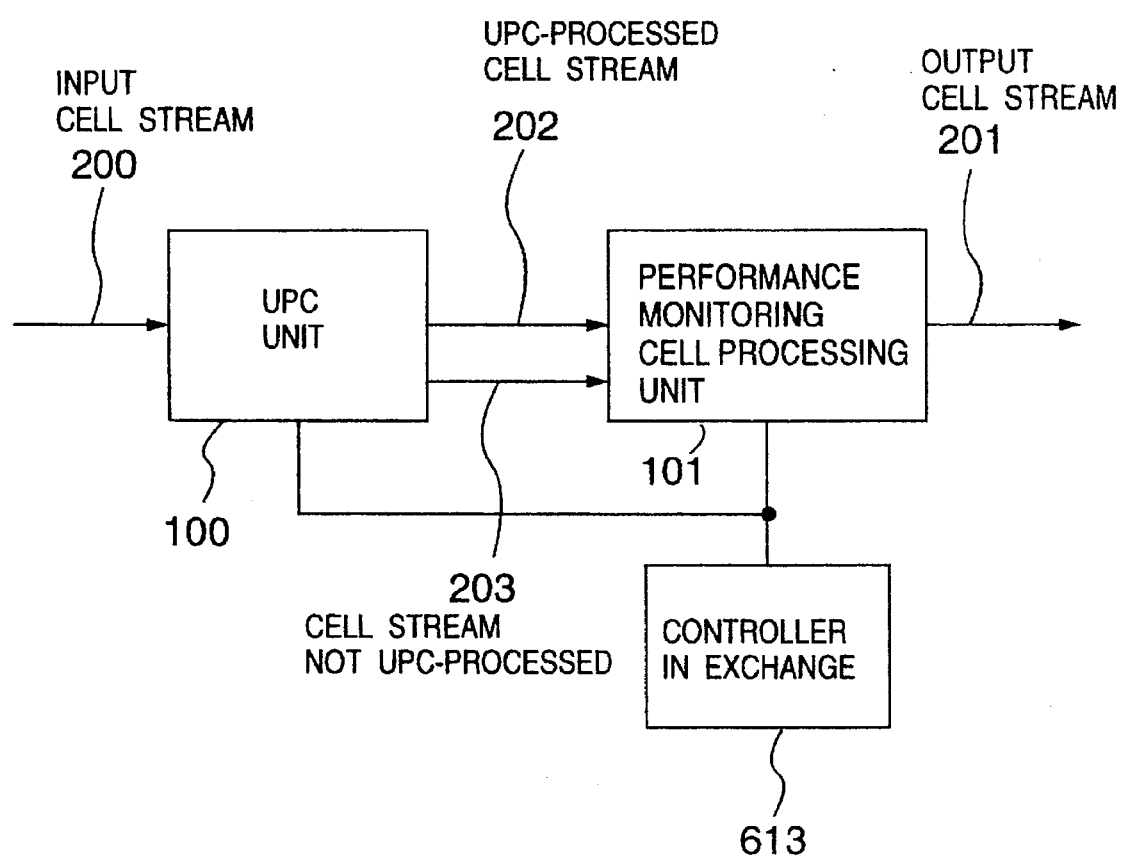
FIG. 1 is a block diagram showing a UPC and performance monitoring apparatus used for cell stream according to an embodiment of the invention.

An embodiment of the invention is described below with reference to the accompanying drawings. FIG. 1 shows a UPC unit 100 and a performance monitoring cell processing unit 101 used for the ATM network according to the invention. The UPC unit 100 and the performance monitoring cell processing unit 101 are provided for an ATM exchange which is arranged within an ATM network for exchanging information, i.e., between the ATM terminals (not shown), and in particular are arranged in each channel processing section on the input side of the ATM exchange. First, the UPC processing will be explained below. Assuming that in spite of the declaration by the user of 20 Mbit/s as a transmission bandwidth of user cell stream from the terminal, the actual transmission is carried out with a bandwidth of 30 Mbit/s caused by a malfunction of the apparatus or a fault of the ATM network. The user cell stream corresponding to 10 Mbit/s is discarded or a marking called tagging is attached to the violating user cell stream indicating that the transmission bandwidth is exceeded. This is called the UPC processing.

The UPC unit 100 and the performance monitoring cell processing unit 101 are shown in FIG. 1. First, the UPC unit 100 receives an input cell stream 200 from a channel side of the channel processing section of an ATM exchange (not shown). This input cell stream 200 includes user cell streams and corresponding performance monitoring cell streams described in detail later. A cell stream 202 subjected to UPC processing and a cell stream 203 not subjected to that are applied to the performance monitoring cell unit 101 from the UPC unit 100. In the processing, the performance monitoring cell stream contained in the cell stream 202 is passed regardless of the UPC processing. Further, the cell stream 203 contains only user cell stream. The performance monitoring cell processing unit 101 extracts or monitors the performance monitoring cell stream from the cell stream 202 and checks for the user cell stream not subjected to the UPC processing on the basis of the performance monitoring cell stream, generates new performance monitoring cell stream on the basis of the user cell stream subjected to the UPC processing, inserts the new performance monitoring cell stream in the cell stream 202, and sends them to an output side of the channel processing section of the ATM exchange as an output cell stream 201. Thus, the feature of the invention lies in that user cell stream not subjected to the UPC processing is checked on the basis of corresponding performance monitoring cell stream.

Figure 2A:
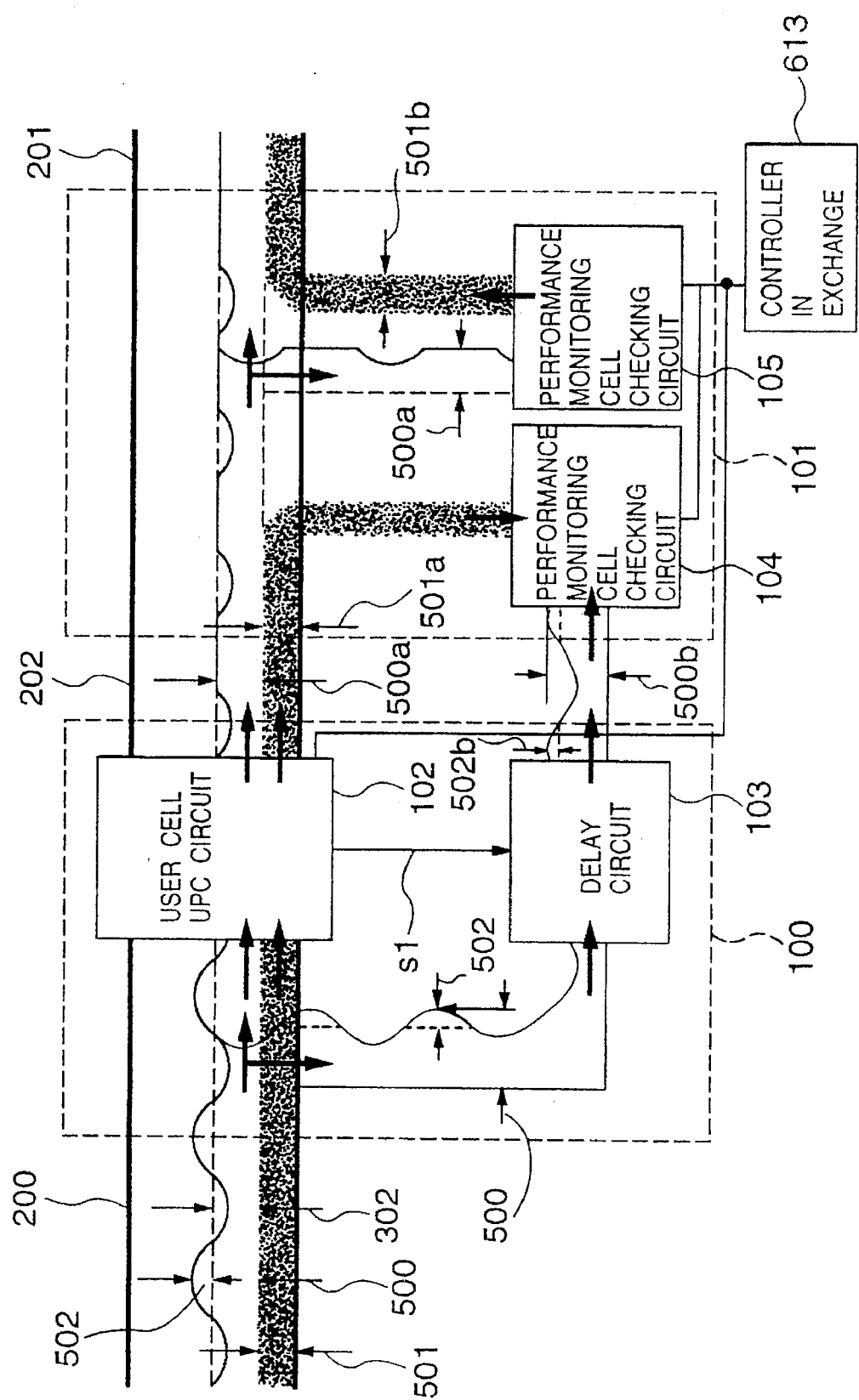
FIG. 2A is a block diagram showing details of the UPC and performance monitoring apparatus shown in FIG. 1.
Figure 2B:
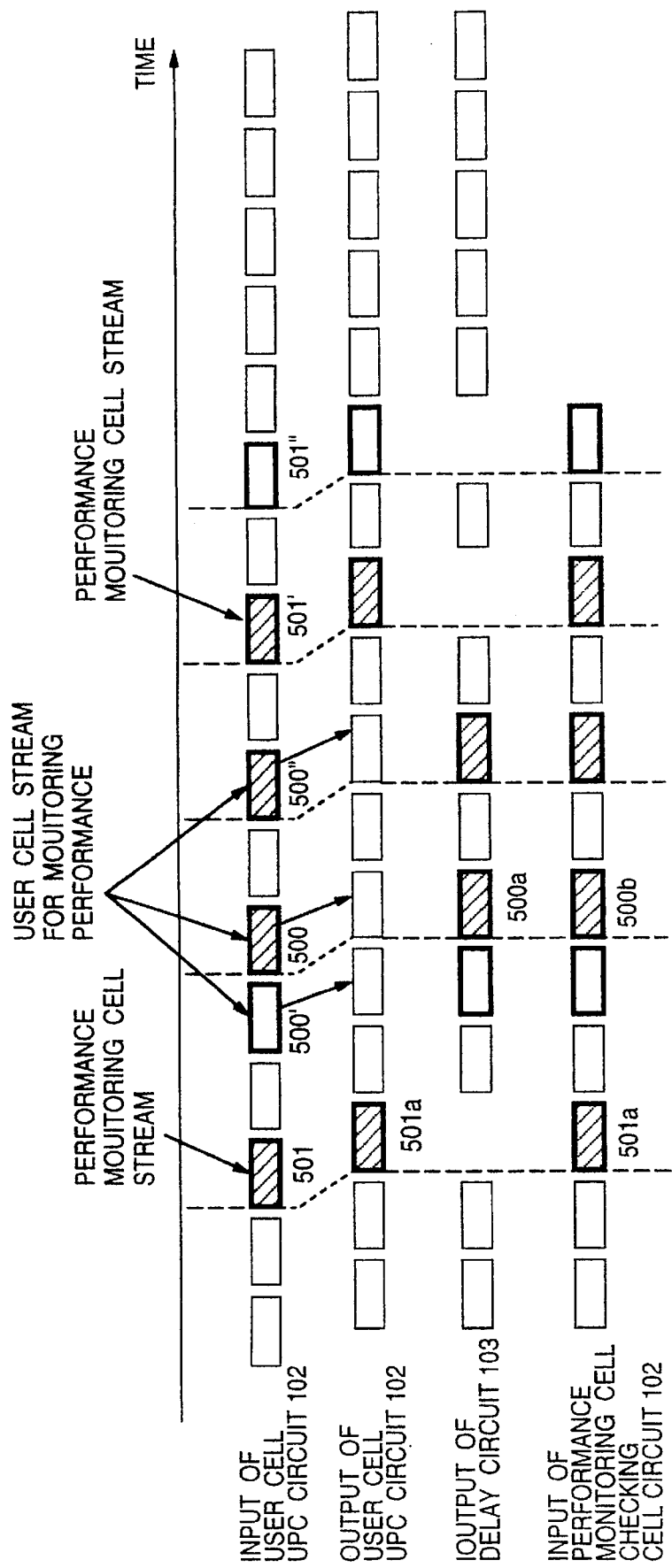
FIG. 2B is a diagram for explaining user cell streams and performance monitoring cell streams.

FIGS. 2A and 2B show more detailed configuration than FIG. 1. In FIG. 2A, the input cell stream 200 contains a user cell stream 500, a declaration-violating cell 502 exceeding the declared bandwidth 302 of the user cell stream 500 and a performance monitoring cell stream 501 corresponding to the user cell stream 500. Other user cell streams 500',500" and corresponding performance monitoring cell streams 501', 501" in the input cell stream 200 are contained in the rest of bandwidth.

As shown in FIG. 2A, the UPC unit 100 includes a user cell UPC circuit 102 and a delay circuit 103. The user cell UPC circuit 102 receives an input cell stream 200. In FIG. 2A, after the user cell stream 500 is subjected to UPC processing, i.e., after the declaration-violating cell 502 is discarded, the input cell stream 200 is applied to the performance monitoring cell processing apparatus 101 as a cell stream 202. In the process, the performance monitoring cell stream 501 corresponding to the user cell stream 500 passes through the user cell UPC circuit 102 regardless of the UPC processing. At the same time, the user cell UPC circuit 102 applies a delay control signal s1 corresponding to the time required for the UPC processing to the delay circuit 103. On the other hand, the delay circuit 103 receives the user cell stream 500. After the user cell stream 500 is delayed by a predetermined time according to the delay control signal s1, a user cell stream 500b corresponding to the cell stream 203 shown as not subjected to the UPC processing in FIG. 1 is output from the delay circuit 103. The delay circuit 103 is for delaying the user cell stream 500b by the time required for the UPC processing of the user cell UPC circuit 102 in order to maintain the phase relationship between the user cell stream 500a subjected to the UPC processing and the user cell stream 500b not subjected to the UPC processing. The delay circuit 103 is configured of a memory or the like for temporarily storing the user cell stream 500.

The performance monitoring cell processing unit 101 includes a performance monitoring cell checking circuit 104 and a performance monitoring cell generation circuit 105. The performance monitoring cell checking circuit 104 receives a performance monitoring cell stream 501a corresponding to the user cell stream 500a from the cell stream 202 subjected to the UPC processing. This performance monitoring cell stream 501a is not subjected to the UPC processing. The performance monitoring cell checking circuit 104 checks the user cell stream 500b not subjected to the UPC processing in accordance with the parameter written in the performance monitoring cell stream 501a. In other words, the performance monitoring cell checking circuit 104 detects cell loss, cell misinsertion or a bit error of the user cell stream 500b. This detection is effected by calculations made from the specific parameter written in the performance monitoring cell stream 501a and the specific number and contents of the user cell stream 500 included in the input cell stream 200. The user cell and the performance monitoring cell are described later. The performance monitoring cell generation circuit 105 generates a performance monitoring cell stream 501b by corresponding to the user cell stream 500a subjected to the UPC processing. The performance monitoring cell stream 501b are inserted in the Cell stream 202 corresponding to the user cell stream 500a subjected to the UPC processing, and output to the output side of the channel processing section of the ATM exchange as an output cell stream 201. The performance monitoring cell checking circuit 104 and the performance monitoring cell generation circuit 105 are connected to a controller 613 within the exchange like a microcomputer so that the performance monitoring parameters inside the performance monitoring cell checking circuit 104 and the performance monitoring cell generation circuit 105 can be read or write from the controller 613.

Now, the user cell streams and the performance monitoring cell streams are described with reference to FIG. 2B. FIG. 2B shows each user cell stream and a corresponding performance monitoring cell stream and a declaration-violating cell 502 on time axis. The input cell stream 200 contains a user cell stream 500, a corresponding performance monitoring cell stream 501, a declaration-violating cell 502 exceeding the declared bandwidth 302 of the user cell stream 500, other cell streams 500', 500" and corresponding performance monitoring cell streams 501', 501". In FIG. 2B, the user cell stream 500 is subjected to the UPC processing and the declaration-violating cell 502 is discarded. The performance monitoring cell checking circuit 104 does not receive the user cell stream 500a subjected to the UPC processing, but the performance monitoring cell stream 501a after a predetermined time later as required for the UPC processing. The performance monitoring cell stream 501a, however, passes through the user cell UPC circuit 102 regardless of the UPC processing. Also, the user cell stream 500 and the declaration-violating cell 502 are delayed by the delay circuit 103 by the time required for the UPC processing of the user cell UPC circuit 102 and is output from the delay circuit 103 as a user cell stream 500b and a declaration-violating cell 502b.

As described above, the user cell stream 500b not subjected to the UPC processing is applied to the performance monitoring cell checking circuit 104, and checked therein by a corresponding performance monitoring cell stream 501a, so that calculations for such performances as the cell loss, cell misinsertion or bit error of the user cell can be accomplished without subjecting to affection of the UPC processing.

Figure 3:
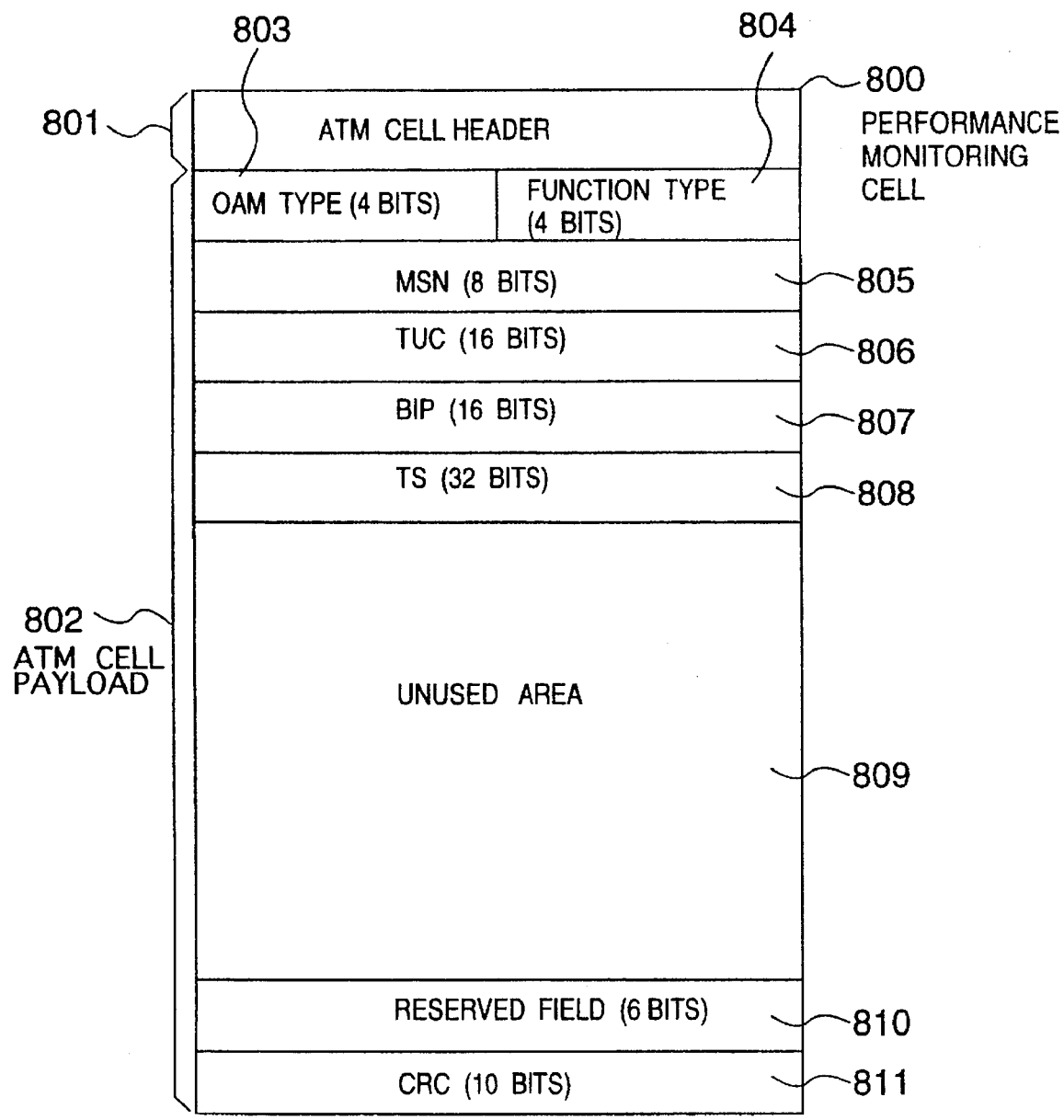
FIG. 3 is a diagram for explaining a performance monitoring cell.

The performance monitoring cell is explained with reference to FIG. 3. FIG. 3 shows an example format of a performance monitoring cell 800, which includes an ATM cell header 801 and an ATM cell payload 802. The ATM cell header 801 has a connection identifier or the like written in it. The ATM cell payload 802 includes, in the order from the top thereof, a 4-bit OAM type code 803 indicating a performance monitoring OAM cell, a 4-bit function type code 804, an 8-bit monitoring cell sequence No. (labeled MSN) 805, a 16-bit total number of user cells (labeled TUC) 806, a 16-bit block error detection code (labeled BIP) 807, a 32-bit time stamp (labeled TS) 808, unused area 809, a 6-bit reserved field 810, and a 10-bit error detection code (labeled CRC) 811. The user cell stream includes an ATM cell header like the performance monitoring cell and has the other areas for the user to write communication data.

The following explanation of an example performance monitoring cell stream executed at the performance monitoring cell checking circuit 104 is simply for reference contributing to the understanding of the invention. For detection of the loss and misinsertion of a user cell stream, the total number of user cell streams inserted on the insertion side is transmitted by being written in TUC 806 for the performance monitoring cell stream. The loss and misinsertion of user cell stream can thus be detected from the difference between the number of cells inserted on the insertion side and the actual number of user cell streams extracted on the extraction side. More specifically, the expected number of user cells, i.e., the difference value of TUC 806 between the performance monitoring cell previously received and the performance monitoring cell currently received on the user-cell extraction side is compared with the number of user cells actually passed through the user-cell extraction side from the time of previous receipt to the time of current receipt of performance monitoring cells.

In other words, the absence of any difference is considered to indicate the absence of the loss or misinsertion of user cells, if an expected number of user cells is large, the loss of user cells is considered to occur, and if the expected number of user cells is small, the misinsertion is considered to occur.

The bit error of the ATM cell payload 802 of the user cell stream can be detected by calculating the BIP 807 for payload of the user cell stream as described below.

On the insertion side, a predetermined logic operation is performed on the ATM cell payload 802 of the user cell stream involved (this user cell stream passed from the time of previous transmission of performance monitoring cell stream to the time of current transmission thereof), and the result thereof is written and transmitted in BIP 807. On the extraction side, the BIP 807 of the user cell stream that have passed is subjected to logic operation in similar fashion and compared with the field value of the BIP 807 thereby to detect the number of bit errors.

Now, another example of the UPC unit 100 and the performance monitoring cell processing unit 101 according to the invention will be explained with reference to FIG. 4. The configuration of each circuit corresponds to that shown in FIG. 2A and therefore will not be described in detail, the explanation being concentrated on the operation. An input cell stream 200 is first applied to a cell decision circuit 601 for deciding whether a cell stream is a user cell stream 500 or a performance monitoring cell stream 501. In the case where it is decided that the cell stream is a user cell stream 500, the cell decision circuit 601 outputs a decision signal t1 indicating whether or not the user cell stream 500 is for the UPC processing, to a UPC decision circuit 600. In the case where the decision of the UPC decision circuit 600 is that the user cell stream 500 is intended for the UPC processing, the UPC decision circuit 600 applies an instruction signal t2 for discarding the declaration-violating cell 502 included in the user cell stream 500 to a disposal control circuit 602. The disposal control circuit 602 carries out disposal processing of the declaration-violating cell 502 included in the user cell stream 500 in response to the instruction signal t2, and outputs a user cell stream as a user cell stream 500a with corresponding performance monitoring cell stream 501a to a cell decision circuit 604 within the performance monitoring cell processing unit 101 as a cell stream 202 subjected to the UPC processing in the same manner as in the case of FIG. 2A. Also, the disposal control circuit 602 outputs an instruction signal s1 to the delay circuit 603 in accordance with the time required for the UPC processing. The delay circuit 603 delays the user cell stream 500 by the time required for the UPC processing of the disposal control circuit 602 in accordance with the instruction signal s1, and applies the delayed output to an intended user cell retrieve section 606 of the performance monitoring cell processing unit 101 as a user cell stream 500b corresponding to the user cell stream 203 not subjected to the UPC processing in the same manner as shown in FIG. 2A. User cell streams together with corresponding performance monitoring cell streams other than the user cell stream 500 and the corresponding performance monitoring cell steam 501 contained in the input cell stream 200 are sent to the output side of the channel processing section of the ATM exchange as an output cell stream 201 through the cell decision circuit 601, the disposal control circuit 602, a cell decision circuit 604 and a performance monitoring extraction/insertion circuit 605 described later.

The cell decision circuit 604 that has received the user cell stream 500a subjected to UPC processing and the corresponding performance monitoring cell stream 501a not subjected to the UPC processing has the same function as the cell decision circuit 601. Nevertheless, the cell decision circuit 604 applies a signal indicating the cell type and a cell control signal to the performance monitoring cell extraction/insertion circuit 605, a first intended user cell retrieve section 606, an intended performance monitoring cell retrieve section 607, a second intended user cell retrieve section 608 and a performance monitoring cell generation circuit 105. More specifically, the cell decision circuit 604 applies an instruction signal t5 indicating whether the performance monitoring check of the user cell stream 500a is to be performed or not to the first intended user cell retrieve section 606 for retrieving the user cell stream 500b not subjected to the UPC processing by referring to the ATM cell header of the performance monitoring cell stream or the user cell stream 500a. In accordance with this instruction signal t5, the intended user cell retrieve section 606 applies the retrieved user cell stream 500b to the performance monitoring cell checking circuit 104. Also, the cell decision circuit 604 applies an instruction signal t6 indicating whether the performance monitoring check of the retrieved performance monitoring cell stream 501a to the intended performance monitoring cell retrieve section 607 is to be effected or not, and the intended performance monitoring cell retrieve section 607 sends the retrieved performance monitoring cell stream 501a to the performance monitoring cell checking circuit 104 in accordance with the instruction signal t6. The performance monitoring cell checking circuit 104 checks the user cell stream 500b not subjected to the UPC processing on the basis of the performance monitoring cell 501a, while at the same time sending the result of checking to the controller 613 with in the exchange. At the same time, the user cell stream 500b is checked with reference to a parameter providing in a parameter table 611. Further, whenever it is necessary to extract the performance monitoring cell stream 501a, the cell decision circuit 604 applies an extraction instruction signal t4 for the performance monitoring cell stream 501a to the performance monitoring cell extraction/insertion circuit 605. In similar fashion, the cell decision circuit 604 applies an instruction signal t7 indicating whether a new performance monitoring cell stream is required to be generated for the performance monitoring cell stream 501a corresponding to the retrieved user cell stream 500a to the intended user cell retrieve section 608. The intended user cell retrieve section 608 applies the retrieved user cell stream 500a to the performance monitoring cell generation circuit 105 in accordance with the instruction signal t7. Also, the cell decision circuit 604 applies an instruction signal t8 designating an idle cell timing required for insertion of the performance monitoring cell stream 501b to be inserted in the output cell stream 201 to the performance monitoring cell generation circuit 105.

The performance monitoring cell generation circuit 105 generates a new performance monitoring cell stream 501b on the basis of the parameter information and the parameters, both already calculated and to be calculated, stored in the parameter table 611 and sends the performance monitoring cell stream 501b to the performance monitoring cell extraction/insertion circuit 605. At the same time, the performance monitoring cell generation circuit 105 applies an instruction signal t9 for inserting the performance monitoring cell stream 501b in the output cell stream 201 in accordance with the instruction signal t8 to the performance monitoring cell extraction/insertion circuit 605. The performance monitoring cell extraction/insertion circuit 605 inserts the performance monitoring cell stream 501b in the output cell stream 201 in accordance with the instruction signal t9.

In this way, the user cell stream 500b not subjected to the UPC processing is retrieved by the intended user cell retrieve section 606 and applied to the performance monitoring cell checking circuit 104, so that the user cell stream 500b not subjected to the UPC processing is checked at the performance monitoring cell stream 501a. The performance calculation of cell loss, cell misinsertion or bit error for the user cell stream 500a subjected to the UPC processing can thus be accomplished without subjecting to affection of the UPC processing. In addition, a new performance monitoring cell stream 501b is generated and inserted in the output cell stream 201.

The parameters described above include: (a) parameters previously extracted from the performance monitoring cell to be used for calculation of the next formed performance monitoring cell; (b) parameters for storing number of the receiving cells, and results being calculated code of detected bit error at every receiving user cell; (c) parameters for cell loss, cell misinsertion and number of bit error these calculated by (a) and (b); and (d) parameters for storing results being calculated a period or interval of request for inserting a performance monitoring cell, number of transmission cells, and code of detected bit error. Accordingly, the parameters include already calculated, and also to be calculated for forming new performance monitoring cell.

Figure 4:
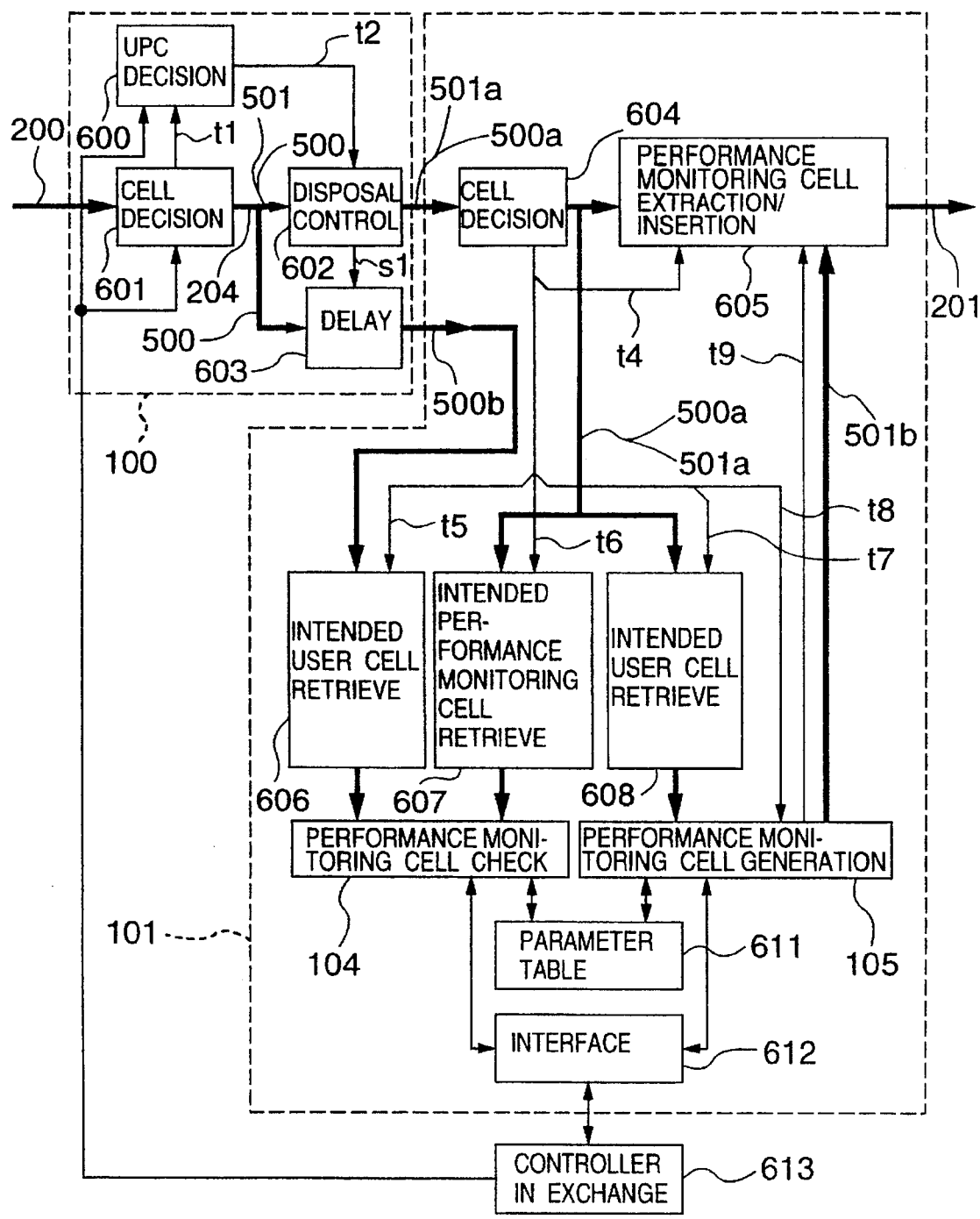
FIG. 4 is a block diagram showing a UPC and performance monitoring apparatus according to another embodiment of the invention.

Although the example of FIG. 2A and FIG. 4 shows a case in which the user cell stream subjected to the UPC processing and the user cell stream not subjected to the UPC processing are processed in series by the UPC unit 100 and the performance monitoring cell processing unit 101, they may alternatively be processed in parallel. Such an example will be explained below with reference to FIG. 5.

Figure 5:
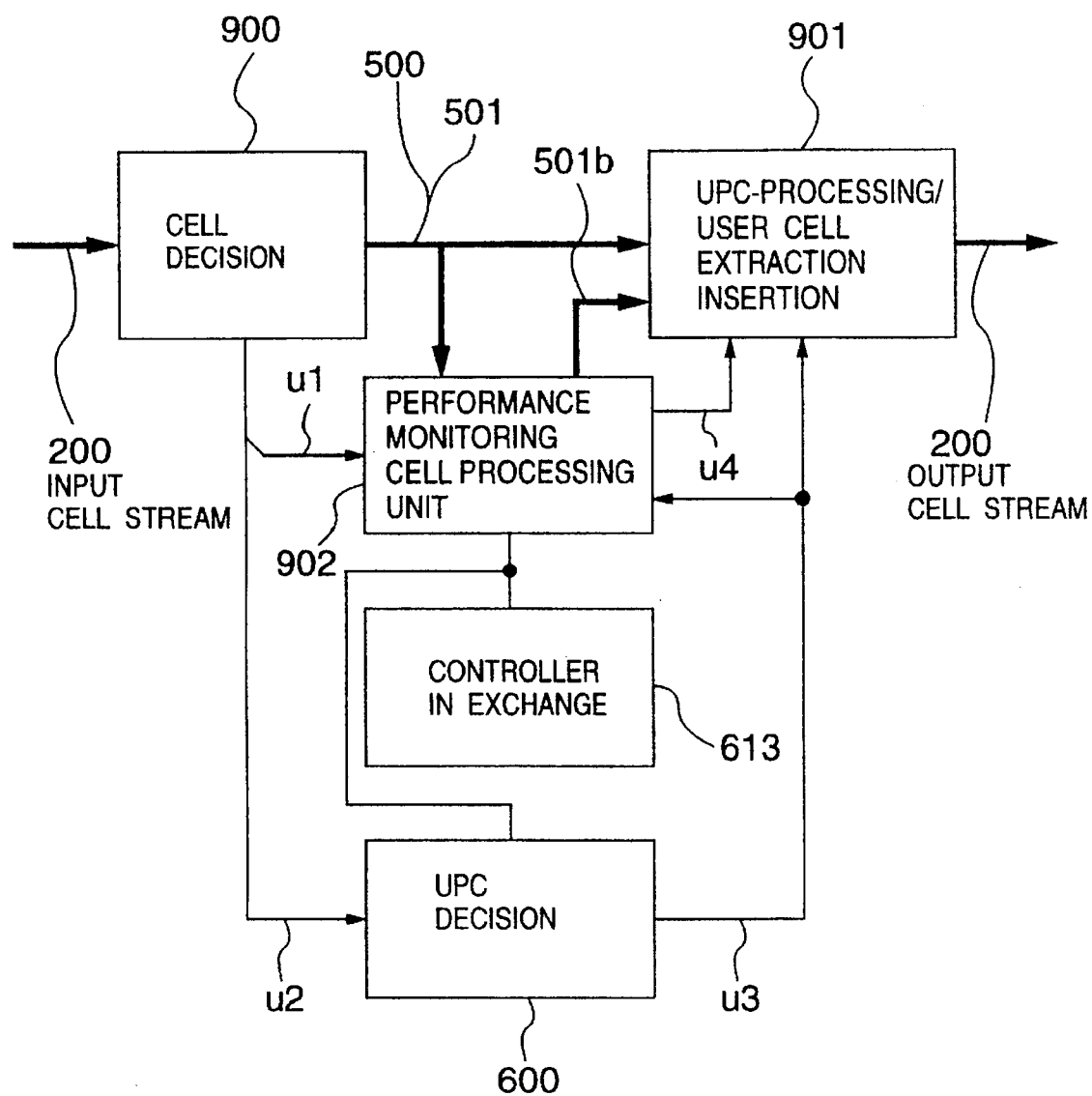
FIG. 5 is a block diagram showing a UPC and performance monitoring apparatus according to still another embodiment of the invention.

FIG. 5 shows a case in which a user cell stream is processed in parallel. The configuration shown in FIG. 5 is described in comparison with the configuration shown in FIGS. 4 and 2A described above. A cell decision circuit 900 includes the cell decision circuits 601 and 604 shown in FIG. 4. The UPC processing/user cell extraction/insertion circuit 901 includes a user cell UPC circuit 602 and a performance monitoring cell extraction/insertion circuit 605 shown in FIG. 4. Also, the performance monitoring cell processing circuit 902 includes, as shown in FIG. 2A, a performance monitoring cell checking circuit 104 and a performance cell generation circuit 105. This performance monitoring cell processing circuit 902 is connected with the controller 613 within the exchange. The UPC decision circuit 600 is identical with the one shown in FIG. 4. The operation of a circuit having this configuration will be explained with reference to the numbers attached to the user cell stream described above and corresponding performance monitoring cell stream.

The input cell stream 200 is applied to the cell decision circuit 900. The cell decision circuit 900 decides on the user cell stream 500 or a corresponding performance monitoring cell stream 501 in the input cell stream 200, and applies an instruction signal u1 indicating the user cell stream 500 or the performance monitoring cell stream 501 to the performance monitoring cell processing circuit 902. Also, the cell decision circuit 900 applies the user cell stream 500 and the performance monitoring cell stream 501 to the performance monitoring cell processing circuit 902 on the one hand and to the UPC processing/user cell extraction/insertion circuit 901. The cell decision circuit 900 applies an instruction signal u2 indicating whether the user cell stream 500 is intended for the UPC processing or not to the UPC decision circuit 600. The UPC decision circuit 600, upon decision that the user cell stream 500 is intended for the UPC processing in accordance with the instruction signal u2, applies the UPC processing instruction signal u3 to the UPC processing/user cell extraction/insertion circuit 901 and the performance monitoring cell processing circuit 902. The performance monitoring cell processing circuit 902 checks the user cell stream 500 not subjected to the UPC processing in accordance with the instruction signals u1 and u3 for any cell loss, cell misinsertion or bit error on the basis of the parameter of the performance monitoring cell stream 501. Also, the performance monitoring cell processing circuit 902 generates a new performance monitoring cell stream 501b on the basis of the user cell stream 500a subjected to the UPC processing in response to the instruction signals u1 and u3 to be output to UPC processing/user cell extraction/insertion circuit 901 together with the instruction signal u4. The UPC processing/user cell extraction/insertion circuit 901 executes the UPC processing of the user cell stream 500 in accordance with the instruction signal u3. In other words, the declaration-violating cell 502 is discarded as a user cell stream 500a subjected to the UPC processing, and the newly-generated performance monitoring cell stream 501b is inserted in the output cell stream 201 in accordance with the instruction signal u4.

Furthermore, when the performance monitoring cell processing circuit 902 finishes checking the user cell stream 500, it outputs the instruction signal u4 to the PC processing/user cell extraction/insertion circuit 901 so as to be coincident with the UPC processing and the insertion of the performance monitoring cell stream 501b in the UPC processing/user cell extraction/insertion circuit 901, so that the performance monitoring cell processing circuit 902 includes a delay circuit to temporarily hold result of checking the user cell stream 500. The UPC processing/user cell extraction/insertion circuit 901 carries out the UPC processing and insertion of the performance monitoring cell stream 501b and inserts the performance monitoring cell stream 501b into the output cell stream 201 with synchronism with the operation of the performance monitoring cell processing circuit 902.

In this way, the checking of the user cell stream 500 not subjected to the UPC processing by the performance monitoring cell processing circuit 902 can be executed in parallel to the UPC processing by the UPC processing/user cell extraction/insertion circuit 901. As a result, the checking of the user cell stream 500 not subjected to the UPC processing can be executed on the basis of the performance monitoring cell stream 501, thereby enabling performance calculations of cell loss, cell misinsertion or bit error for the user cell stream 500a subjected to the UPC processing in parallel without subjecting to affection of the UPC processing.

As described above, the embodiments describe that the user cell stream 500 is subject to the UPC processing and the performance monitoring, but the circuits shown in FIG. 1, FIG. 2A, FIG. 4 and FIG. 5 can carry out that a first to Nth user cell streams are subject to the UPC processing and the performance monitoring at the same, as indicated the user cell streams 500' and 500". In this case, identification for the first to Nth user cell streams can be carried out be each of the connection identifiers stored in the parameter table 611. More specifically, a single circuitry can carries out the UPC processing and the performance monitoring at the same time since the input cell stream 200 is multiplexed, so that a single user cell stream appears or lies at a predetermined time to identify with a connection identifier.

I claim:

1. A usage parameter control and performance monitoring apparatus used for an ATM network for UPC (Usage Parameter Control) processing and monitoring the performance of cell streams in asynchronous transfer mode, comprising:

a UPC apparatus which receives an input cell stream and executes the UPC processing of the input cell stream;

a performance monitoring cell processing circuit which receives said input cell stream and monitors the performance of said input cell stream in accordance with a performance monitoring cell stream corresponding to the input cell stream received by said UPC apparatus, wherein said performance monitoring cell processing circuit includes a performance monitoring cell checking circuit which checks a user cell stream not subjected to the UPC processing in accordance with the performance monitoring cell stream.

2. An apparatus according to claim 1, wherein said UPC apparatus and said performance monitoring cell processing circuit are included in a channel processing section provided for each channel on input side of an ATM exchange.

3. An apparatus according to claim 1, wherein said UPC apparatus includes a user cell UPC circuit for executing the UPC processing of a first one of a plurality of user cell streams contained in said input cell stream and passing the other user cell streams, and a delay circuit for delaying the first user cell stream by the time required for the UPC processing by said user cell UPC circuit.

4. A usage parameter control and performance monitoring apparatus used for an ATM network for UPC (Usage Parameter Control) processing and monitoring the performance of cell streams in asynchronous transfer mode, comprising:

a UPC apparatus which receives an input cell stream and executes the UPC processing of the input cell stream; and a performance monitoring cell processing circuit which receives said input cell stream and monitors the performance of said input cell stream in accordance with a performance monitoring cell stream corresponding to the input cell stream received by said UPC circuit, wherein said UPC apparatus includes a user cell UPC circuit which executes the UPC processing of a first one of a plurality of user cell streams contained in said input cell stream and passes the other user cell streams, and a delay circuit which delays the first user cell stream by the time required for the UPC processing by said user cell UPC circuit, wherein said performance monitoring cell processing circuit includes a performance monitoring cell checking circuit which receives a first performance monitoring cell stream corresponding to the first user cell stream from said UPC circuit and also said first user cell stream not subjected to UPC processing from said delay circuit in synchronism with the first performance monitoring cell stream, said performance monitoring cell checking circuit checks the first user cell stream not subjected to the UPC processing in accordance with the first performance monitoring cell stream, and a performance monitoring cell generation circuit which generates a second performance monitoring cell stream corresponding to the second user cell stream subjected to the UPC processing.

5. A usage parameter control and performance monitoring apparatus used for an ATM network for UPC (Usage Parameter Control) processing and monitoring the performance of cell streams in asynchronous transfer mode, comprising:

a UPC apparatus which receives an input cell stream and executes the UPC processing of the input cell stream; and a performance monitoring cell processing circuit which receives said input cell stream and monitors the performance of said input cell stream in accordance with a performance monitoring cell stream corresponding to the input cell stream received by said UPC circuit, wherein said UPC apparatus includes a user cell UPC circuit which executes the UPC processing of a first one of a plurality of user cell stream contained in said input cell stream and passes the other user cell streams, and a delay circuit which delays the first user cell stream by the time required for the UPC processing by said user cell UPC circuit, wherein said UPC apparatus comprises:

a cell decision circuit which discriminates said first user cell stream from said first performance monitoring cell stream corresponding to said first user cell stream, passes user cell streams other than said first user cell stream and produces a decision signal indicating that said first user cell stream is intended for the UPC processing, a UPC decision circuit which produces an instruction signal for designating the UPC processing in response to said decision signal, a UPC circuit which receives said first user cell stream and said first performance monitoring cell stream corresponding to said first user cell stream, executes the UPC processing in accordance with the instruction signal from said UPC decision circuit and produces the second user cell stream subjected to the UPC processing and the first performance monitoring cell stream corresponding to said second user cell stream, and a delay circuit which receives said first user cell stream from said cell decision circuit and delays said first user cell stream by the time required for the UPC processing by said UPC circuit.

6. An apparatus according to claim 5, wherein said performance monitoring cell processing circuit includes:

a cell decision circuit for receiving said second user cell stream subjected to the UPC processing and said first performance monitoring cell stream corresponding to said second user cell stream, discriminating said second user cell stream from said first performance monitoring cell stream corresponding to said second user cell stream, and passing user cell streams and corresponding performance monitoring cell streams other than said second user cell stream and said first performance monitoring cell stream;

a first intended user cell retrieve section for receiving said first user cell stream not subjected to UPC processing from said delay circuit;

an intended performance monitoring cell retrieve section for receiving said first performance monitoring cell stream from said cell decision circuit;

a performance monitoring cell checking circuit for checking said first user cell stream not subjected to the UPC processing from said first intended user cell retrieve section in accordance with said first performance monitoring cell stream from said intended monitoring cell retrieve section;

a second intended user cell retrieve section for receiving said second user cell stream subjected to the UPC processing from said cell decision circuit;

a performance monitoring cell generation circuit for newly generating a second performance monitoring cell stream corresponding to said second user cell stream; and a performance monitoring cell extraction/insertion circuit for inserting said second performance monitoring cell stream generated by said performance monitoring cell generation circuit in said other user cell streams and said performance monitoring cell streams passed through said cell decision circuit.

7. An apparatus according to claim 6, wherein said performance monitoring cell processing circuit includes a parameter table which stores parameters both already calculated and to be calculated for a performance monitoring cell stream, said performance monitoring cell checking circuit includes a first circuit which checks said first user cell stream not subjected to the UPC processing using said calculated parameter, and said performance monitoring cell generation circuit includes a second circuit which generates said second performance monitoring cell stream using said calculated parameter.

8. A usage parameter control and performance monitoring apparatus used of an ATM network for executing the UPC processing and monitoring the performance of cell streams in asynchronous transfer mode, comprising:

a cell decision circuit which receives an input cell stream, discriminates a first specific one of a plurality of user cell streams from a first performance monitoring cell both contained in said input cell stream, produces said first user cell stream and a first performance monitoring cell stream, passes user cell streams and corresponding performance monitoring cell streams other than said first user cell stream and said first performance monitoring cell stream, and produces a first instruction signal indicating selected one of said first user cell stream and said first performance monitoring cell stream and also a second instruction signal indicating whether said first user cell stream is intended for the UPC processing;

a performance monitoring cell processing circuit which receives said first user cell stream, a first performance monitoring cell stream and said first instruction signal from said cell decision circuit;

a UPC decision circuit which receives said second instruction signal from said cell decision circuit and produces a third instruction signal for UPC processing when said second instruction signal indicates UPC processing; and a UPC processing/user cell extracting/insertion circuit which receives said first user cell stream and said first performance monitoring cell stream from said cell decision circuit;

wherein said performance monitoring cell processing circuit checks said first user cell stream in accordance with said first performance monitoring cell stream in accordance with said first instruction signal and said third instruction signal, generates a second performance monitoring cell stream for said first user cell stream, and produces a corresponding fourth instruction signal, said UPC processing/user cell extraction/insertion circuit inserting said second performance monitoring cell stream from said performance monitoring cell processing circuit in the user cell streams and corresponding performance monitoring cell streams other than said first user cell stream and said first performance monitoring cell stream in accordance with said third and fourth instruction signals, thereby performing the checking of said first user cell stream not subjected to the UPC processing and the UPC processing of said first user cell stream in parallel.

9. An apparatus according to claim 8 further comprising a cell decision circuit, a performance monitoring cell processing circuit, a UPC decision circuit and a UPC processing/user cell extraction/insertion circuit, said UPC apparatus and said performance monitor being included in a channel processing section provided for each channel on input side of an ATM exchange.

10. An apparatus according to claim 8, wherein said UPC processing/user cell extraction/insertion circuit executes the UPC processing of multiple ones of a plurality of user cell streams contained in the input cell stream and passing the other user cell streams.

* * * * *